Jan. 16, 1945.　　O. J. HUELSTER　　2,367,217
SEPARABLE FASTENER
Filed Sept. 10, 1942

INVENTOR.
Otto J. Huelster.
BY
Fraser, Myers & Mauley
ATTORNEYS

Patented Jan. 16, 1945

2,367,217

UNITED STATES PATENT OFFICE 2,367,217

SEPARABLE FASTENER

Otto J. Huelster, Waterbury, Conn., assignor to Scovill Manufacturing Company, Waterbury, Conn., a corporation of Connecticut Application September 10, 1942, Serial No. 457,817

10 Claims. (Cl. 24—213)

My present invention relates to separable snap fastener assemblies and to the constituent fastener members thereof, and aims to provide certain improvements in such devices.

The conventional types of separable snap fastener assembly consist of a rigid stud member and a resilient socket member suitably affixed to supporting media or sheets, the stud and socket members having complemental parts which may be temporarily engaged and disengaged in the usual manner of snap fasteners. In certain of these types of fastener assemblies the socket member has a resilient tubular portion which is surrounded and protected by a cylindrical wall to prevent injury thereto when a garment provided with such fasteners is passed through a mangle during the laundering thereof. On the stud member, however, the stud projects a considerable distance above the base or securing flange and because of this projection, there is a tendency for the stud, when disposed is in unprotected position, to pit the rubber type of wringer rolls when running through garments having such members attached thereto. Further, in certain types of laundry mangles wherein metal rolls are employed, this stud, when disposed in certain positions on garments running through the mangle, are liable to be distorted so severely as to interfere with or even completely destroy its ability to cooperate with the complemental socket member.

My present invention overcomes the above objections by the simple but unobvious expedient of reversing the arrangement of the fastener members, that is, by making the socket member rigid and making the stud member resilient. By making the socket member rigid and preferably of double walled thickness I am enabled to make the socket member of lesser height and of larger diameter than the studs of conventional fasteners and thereby prevent deformation of said socket member and overcome the tendency of said members toward pitting the wringer rolls. I am also enabled to give to the resilient stud member the protection of a second wall to prevent injury or distortion of said stud member when subjected to wringer or mangle treatment.

The invention also embodies other features of novelty all of which will become more apparent from the detailed description which follows when considered in connection with the accompanying drawing showing several embodiments, and wherein.

Figure 1:
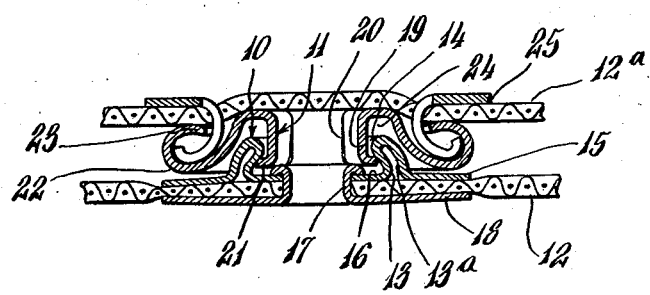
Figure 1 shows a diametrical section through the snap fastener assembly embodying my invention.

Referring first to Fig. 1 of the drawing, the separable snap fastener assembly may be said to consist of a rigid socket member 10 and a resilient stud member 11, said members being suitably affixed to carrying media or sheets 12 and 12a, respectively.

The socket member 10 is rigidly formed by providing an upstanding rim having a double wall thickness as indicated at 13, 13a, said wall being inclined radially inwardly to provide a portion of reduced diameter 14 at its outer rim, the outer wall having a radially outwardly directed flange 15, and the inner wall having a radially inwardly directed flange 16. The socket member may be conveniently secured to the sheet 12 by an eyelet 17 having a flange 18 overlying the flanges 15 and 16 on the socket member and between which latter flanges and the flange 18 the sheet is firmly secured.

The stud member 11 has a central tubular portion 19 which is split along one or more axial lines 20 to provide resilient fingers each of which at its outer or socket engaging end is formed with a radially outwardly directed flange 21 which is adapted to engage behind the rim portion 14 of the socket. Integrally formed with the tubular portion 19 and extending radially outwardly from the inner end thereof and flaring axially outwardly from said inner end is a breast portion 22, the free end of which is reversely turned, as indicated at 23, to provide a retaining ring. The breast portion 22 preferably extends axially beyond the end of the tubular portion 19 and is radially spaced therefrom to form therewith an annular recess 24 within which the tubular portion of the socket member is adapted to be received and confined when the socket member and the stud member are in engaged assembled relation. The stud member may be secured to the sheet 12a by a pronged attaching ring 25 in a manner well known.

Figure 2:
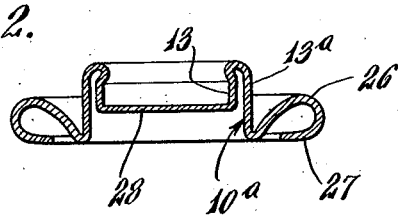
Fig. 2 shows a diametrical section through a modified form of socket member from that shown in Fig. 1 and adapted for cooperative use with the stud member shown in Fig. 1.

In the modified form of socket member 10a shown in Fig. 2 the outer wall 13a of the double wall thickness socket member is formed with a breast portion 26 and reversely curved retaining ring 27 of a character analogous to the breast portion and retaining ring 22 and 23 above described and intended for securing the socket member to a carrying sheet through the medium of a pronged attaching ring analogous to the ring 25. The inner wall 13 of the socket member may have its inner edge or rim reinforced by the integrally formed disc 28.

Figure 3:
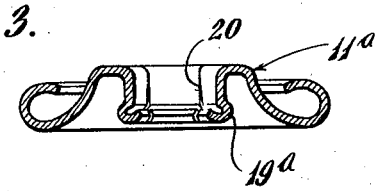
Fig. 3 shows a diametrical section through a modified form of stud member from that shown in Fig. 1 and adapted for cooperative use with the socket members shown in Figs. 1 and 2.

The stud member 11a shown in Fig. 3 is similar in all respects but one to the stud member 11 shown in Fig. 1, the only point of difference being that where in Fig. 1 the outer end of the tubular portion 19 is flanged outwardly, the outer end of the tubular portion in Fig. 3 is formed as an outwardly directed beaded flange 19a.

Figure 4:
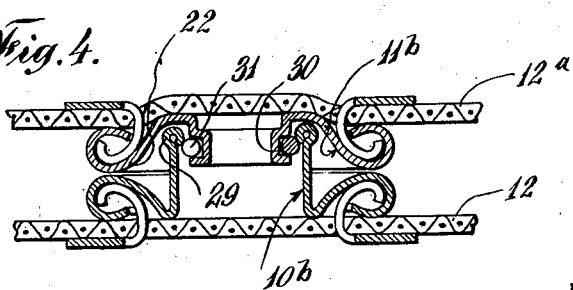
Fig. 4 shows a diametrical section through another modification of the fastener assembly.

In the embodiment of my invention shown in Fig. 4 the socket member 10b instead of being formed with a double wall socket as shown in Figs. 1 and 2, has but a single wall thickness but is reinforced at its outer end or rim with an integral annular bead 29 which provides the rim of the socket at its outer end with a portion of reduced diameter for cooperation with the stud member which is adapted to be received therein. The stud member 11b as shown in Fig. 4 also differs from that shown in Figs. 1 and 3 in that the stud member shown in Fig. 4, instead of having a plurality of spring fingers for engaging within the socket member, is formed with an outwardly directed annular recess 30 within which is mounted a split spring ring 31 having a normal diameter larger than the inner diameter at the rim 29 of the socket member 10b through which it is adapted to be forced in the course of which the diameter of the ring will be reduced, and after passing through the beaded rim 29 will again expand to retain the fastener members in assembled relation.

Considering the various modifications of the stud members hereinbefore described it will be apparent that the stud per se is at all times protected by the breast portion which extends axially beyond the outer end of the stud, and inasmuch as there is at least four thicknesses of metal at the breast portion of the fastener element it will be appreciated that when a garment to which a stud member such as described is attached is passed through a mangle or a wringer the stud member at the breast portion thereof will bear the full force of the compressive action of the rolls and protect the stud from injury or deformation. It will also be apparent that by virtue of the reversal of the parts in my present snap fastener I am enabled to make the socket member of lesser height and of larger diameter than the stud members heretofore made and thus reduce materially the tendency toward pitting the wringer rolls and the distortion or deformation of the socket member by a mangle when garments provided with such socket elements as hereinbefore described are passed through such devices. In the various modifications of the invention as disclosed it will also be noted that both the socket members and the stud members each have a radially outwardly directed portion and that the axial dimensions of said socket and stud members are such that when said members are in engaged assembled relation the radially outwardly directed portions thereof will be in substantially contacting relation and thereby prevent the tilting off of one member from the other. This stability between the assembled fastener members is further enhanced by the fact that when the stud and socket members are in assembled relation the socket engages within and substantially contacts the walls of the annular recess provided in the stud member between the stud proper and the flaring wall of the breast portion. The substantially contacting relation between the radially outwardly directed portion on the respective fastener members when in assembled relation and the disposition of the socket within the annular recess in the stud member also operates to resist any severe lateral strains imposed upon the fastener members and will prevent too much lateral movement of the socket relative to the stud such as would distort the resilient fingers of the stud to any damaging extent and thus prevent deformation or multilation of the fastener elements should they, in assembled relation on a garment, be passed through the rolls of a mangle in the laundering process.

From the foregoing detailed description it will be understood that I have provided an improved snap fastener assembly which eliminates the objections and deficiencies inherent in conventional types of snap fasteners and accomplishes this in an exceedingly simple manner, and although I have shown and described several embodiments of my improved fastener it is to be understood that I do not wish to be limited to the specific details disclosed since these may be varied within the range of engineering skill without departing from the spirit of my invention as defined in the accompanying claims.

What I claim is:

1. A stud part for snap fasteners, said part comprising a central stud member, said stud member having a circumferentially enlarged yieldable means at one end for engaging a socket part of a fastener, a circumferential breast flange portion extending outwardly from the other end of said stud member and axially to a point beyond the first said end, and said breast flange portion terminating in a reversely and inwardly turned means providing attachment of the stud part to a support.

2. A stud part for snap fasteners, said part comprising a central stud member, said stud member having a circumferentially enlarged yieldable means at one end for engaging a socket part of a fastener, a circumferential breast flange portion extending outwardly from the other end of said stud member and axially to a point beyond the first said end, said breast flange portion terminating in a reversely and inwardly turned means providing attachment of the stud part to a support, and said breast flange portion comprising a curved wall spaced from said stud member to form a circumferential socket part receiving recess.

3. A stud part for snap fasteners, said part comprising a central stud member, said stud member having a circumferentially enlarged yieldable means at one end for engaging a socket part of a fastener, a circumferential breast flange portion extending outwardly from the other end of said stud member and axially to a point beyond the first said end, said breast flange portion terminating in a reversely and inwardly turned means providing attachment of the stud part to a support, said breast flange portion comprising a curved wall spaced from said stud member to form a circumferential socket part receiving recess, said yieldable means comprising circumferentially spaced spring parts of the stud member, and said circumferential enlargement of said spring parts comprising projections extending into said recess and within the circumferential boundaries of said wall of the breast flange portion.

4. A stud part for snap fasteners, said part comprising a central tubular stud member, said stud member having a circumferentially enlarged yieldable means at one end for engaging a socket part of a fastener, a circumferential breast flange portion extending outwardly from the other end of said stud member and axially to a point beyond the first said end, said breast flange portion terminating in a reversely and inwardly turned means providing attachment of the stud part to a support, said breast flange portion comprising a curved wall spaced from said stud member to form a circumferential socket part receiving recess, said yieldable means comprising circumferentially spaced spring parts of the stud member, said circumferential enlargement of said spring parts comprising projections extending into said recess and within the circumferential boundaries of said wall of the breast flange portion, and said spring parts having projections extending into the bore of said tubular stud member at the free end portion thereof.

5. A stud part for snap fasteners, said part comprising a central stud member, said stud member having a circumferentially enlarged yieldable means at one end for engaging a socket part of a fastener, a circumferential breast flange portion extending outwardly from the other end of said stud member and axially to a point beyond the first said end, said breast flange portion terminating in a reversely and inwardly turned means providing attachment of the stud part to a support, said breast flange portion comprising a curved wall spaced from said stud member to form a circumferential socket part receiving recess, said stud member adjacent the free end thereof having an annular groove, and the circumferential enlargement of said yieldable means comprising a spring ring mounted in said groove and projecting into said recess.

6. A stud part for snap fasteners of the kind defined, said part comprising a tubular stud member formed from circumferentially arranged portions adapted to yield inwardly with respect to the axis of said member, said portions terminating at one end of said member in a circumferentially enlarged portion comprising outwardly and radially extending projections adapted to engage a socket part of a fastener, the other end of said portions of the stud member having an outwardly and radially extending annular wall defining one side of the stud part, said stud part having a circumferential wall portion extending from the first named wall of the stud part in forming an annular bearing surface at the other side of said part arranged in radial spaced relation to and beyond the first named end of the stud member, and said last named wall portion having means providing attachment of the stud part to a support.

7. A stud part for snap fasteners, said part comprising a circumferential ring body at one side thereof, a stud member projecting from said body in the direction of the other side thereof, said stud part including a circumferential wall portion forming an annular bearing surface at the other side of the stud part, spaced radially from and beyond the end limits of said stud member, said wall portion being connected with said ring body, the ends of said wall portion being reversely curved to provide for attachment of the stud part with a support, and said stud member having circumferentially enlarged yieldable means arranged within and spaced from said wall portion.

8. A stud element for a snap fastener, said element comprising an annular breast wall part of a depth defining the thickness of the resulting element, the periphery of said wall terminating in a reversely curved portion, said element having a central tubular member, one end of which joins the breast wall part in an annular radial wall portion spacing said tubular member from said breast wall part, and said tubular member including yieldable means terminating at the other end of said member in substantially circumferential enlargements extending radially inwardly and outwardly of the walls of said tubular member and arranged within the depth of said breast wall part.

9. A stud element for a snap fastener, said element comprising an annular breast wall part of a depth defining the thickness of the resulting element, the periphery of said wall terminating in a reversely curved portion, said element having a central tubular member, one end of which joins the breast wall part in an annular radial wall portion spacing said tubular member from said breast wall part, said tubular member being of a length less than the depth of said breast wall part to arrange the other end of said tubular member within circumferential boundaries defined by said breast wall part, the last named end portion of said tubular member having on its outer surface an annular groove and on its inner surface an annular projection, and a spring ring mounted in the groove of said tubular stud member in forming a circumferential enlargement on said member.

10. A stud element for a snap fastener, said element comprising an annular breast wall part element of curved cross sectional contour and of a depth defining the thickness of the resulting stud element, said element having a central tubular member spaced radially from and integrally united with the breast wall part by an annular radial wall portion at one end of said tubular member, the length of said tubular member being less than the depth of said breast wall part to arrange the other end of said tubular member within circumferential boundaries defined by said breast wall part, and said tubular member including circumferentially enlarged socket engaging means at the last named end of said member yieldable inwardly and radially with respect to the axis of said tubular member.

OTTO J. HUELSTER.